United States Patent [19]
Kogetsu et al.

[11] Patent Number: 5,305,822
[45] Date of Patent: Apr. 26, 1994

[54] AIR CONDITIONING APPARATUS HAVING A DEHUMIDIFYING OPERATION FUNCTION

[75] Inventors: Katsumi Kogetsu; Kanji Takebayashi; Shigeto Sumitani, all of Fuji; Hiroaki Kuroyanagi, Shizuoka; Takeshi Sato, Fuji; Naozumi Sukegawa, Fuji; Hidetoshi Fukunaga, Fuji, all of Japan

[73] Assignee: Kabushiki Kaisha Toshiba, Kawasaki, Japan

[21] Appl. No.: 70,211

[22] Filed: Jun. 2, 1993

[30] Foreign Application Priority Data

Jun. 2, 1992 [JP] Japan .................................. 4-141503

[51] Int. Cl.$^5$ ...................... F25B 29/00; F25B 13/00
[52] U.S. Cl. ......................................... 165/12; 165/21; 165/29; 62/160; 62/173; 62/176.6; 62/181; 62/229; 62/238.7; 62/296; 236/44 C
[58] Field of Search ............... 165/29, 12, 21; 62/238.6, 238.7, 296, 173, 160, 176.6, 181, 229; 237/2 B

[56] References Cited

U.S. PATENT DOCUMENTS

| | | | |
|---|---|---|---|
| 3,779,031 | 12/1973 | Akiyama et al. | 62/160 |
| 4,448,597 | 5/1984 | Kuwabara et al. | 62/176.6 |
| 4,457,137 | 7/1984 | Kohzuma | 62/160 |
| 4,482,008 | 11/1984 | Nomaguchi et al. | 62/160 |
| 4,905,894 | 3/1990 | Noguchi | 237/2 B |
| 4,938,032 | 7/1990 | Mudford | 62/160 |
| 4,984,433 | 1/1991 | Worthington | 62/176.6 |
| 5,044,425 | 9/1991 | Tatsumi et al. | 62/181 |
| 5,231,845 | 8/1993 | Sumitani et al. | 62/173 |

FOREIGN PATENT DOCUMENTS

| | | |
|---|---|---|
| 61-43631 | 9/1986 | Japan . |
| 62-40289 | 10/1987 | Japan . |
| 2-203172 | 8/1990 | Japan . |
| 3-164666 | 7/1991 | Japan . |
| 3-177755 | 8/1991 | Japan . |
| 3-255861 | 11/1991 | Japan . |
| 2258302 | 2/1993 | United Kingdom . |

Primary Examiner—John K. Ford
Attorney, Agent, or Firm—Cushman, Darby & Cushman

[57] ABSTRACT

An electric expansion valve is arranged between a first indoor heat exchanger and a second indoor heat exchanger. At a time of cooling operation, the electric expansion valve is fully opened to connect both the indoor heat exchangers to each other. At a time of dehumidifying operation the electric expansion valve is narrowed to apply a pressure reducing action across these indoor heat exchangers so that the first indoor heat exchanger acts as a reheater and the second indoor heat exchanger as an evaporator. The indoor air is cooled and dehumidified by the second heat exchanger and then reheated by the first indoor heat exchanger and blown into the room. At a time of dehumidifying operation, the temperature of the air blown into the room varies by controlling the speed of an outdoor fan. When the outdoor fan is rendered from an OFF to an ON state or from the ON to the OFF state, the opening extent of the electric expansion valve is set first to an initial opening level and then gradually varied to a target opening level. By so doing, it is possible to prevent refrigerant noise at the electric expansion valve.

17 Claims, 14 Drawing Sheets

FIG. 6A

| | | | |
|---|---|---|---|
| +3.5 | RATHER FORCED-COOLING SIDE DEHUMIDIFYING (COMPRESSOR →↑, LARGE CAPACITY, INDOOR FAN →↑, MEDIUM SPEED) 20 | RATHER FORCED-COOLING SIDE DEHUMIDIFYING (COMPRESSOR →↑, LARGE CAPACITY, INDOOR FAN →↑, MEDIUM SPEED) 21 | RATHER FORCED-COOLING SIDE DEHUMIDIFYING (COMPRESSOR →↑, LARGE CAPACITY, INDOOR FAN →↑, MEDIUM SPEED) 22 | RATHER FORCED-COOLING SIDE DEHUMIDIFYING (COMPRESSOR →↑, LARGE CAPACITY, INDOOR FAN →↑, MEDIUM SPEED) 23 |
| +2.0 | RATHER FORCED-COOLING SIDE DEHUMIDIFYING (COMPRESSOR →↑, MEDIUM CAPACITY, INDOOR FAN →↑, LOW SPEED) 16 | RATHER FORCED-COOLING SIDE DEHUMIDIFYING (COMPRESSOR →↑, MEDIUM CAPACITY, INDOOR FAN →↑, LOW SPEED) 17 | RATHER FORCED-COOLING SIDE DEHUMIDIFYING (COMPRESSOR →↑, MEDIUM CAPACITY, INDOOR FAN →↑, LOW SPEED) 18 | RATHER FORCED-COOLING SIDE DEHUMIDIFYING (COMPRESSOR →↑, MEDIUM CAPACITY, INDOOR FAN →↑, LOW SPEED) 19 |
| +1.0 | RATHER FORCED-COOLING SIDE DEHUMIDIFYING (COMPRESSOR →↑, SMALL CAPACITY, INDOOR FAN →↑, VERY LOW SPEED) 12 | RATHER FORCED-COOLING SIDE DEHUMIDIFYING (COMPRESSOR →↑, SMALL CAPACITY, INDOOR FAN →↑, VERY LOW SPEED) 13 | RATHER FORCED-COOLING SIDE DEHUMIDIFYING (COMPRESSOR →↑, SMALL CAPACITY, INDOOR FAN →↑, VERY LOW SPEED) 14 | RATHER FORCED-COOLING SIDE DEHUMIDIFYING (COMPRESSOR →↑, SMALL CAPACITY, INDOOR FAN →↑, VERY LOW SPEED) 15 |

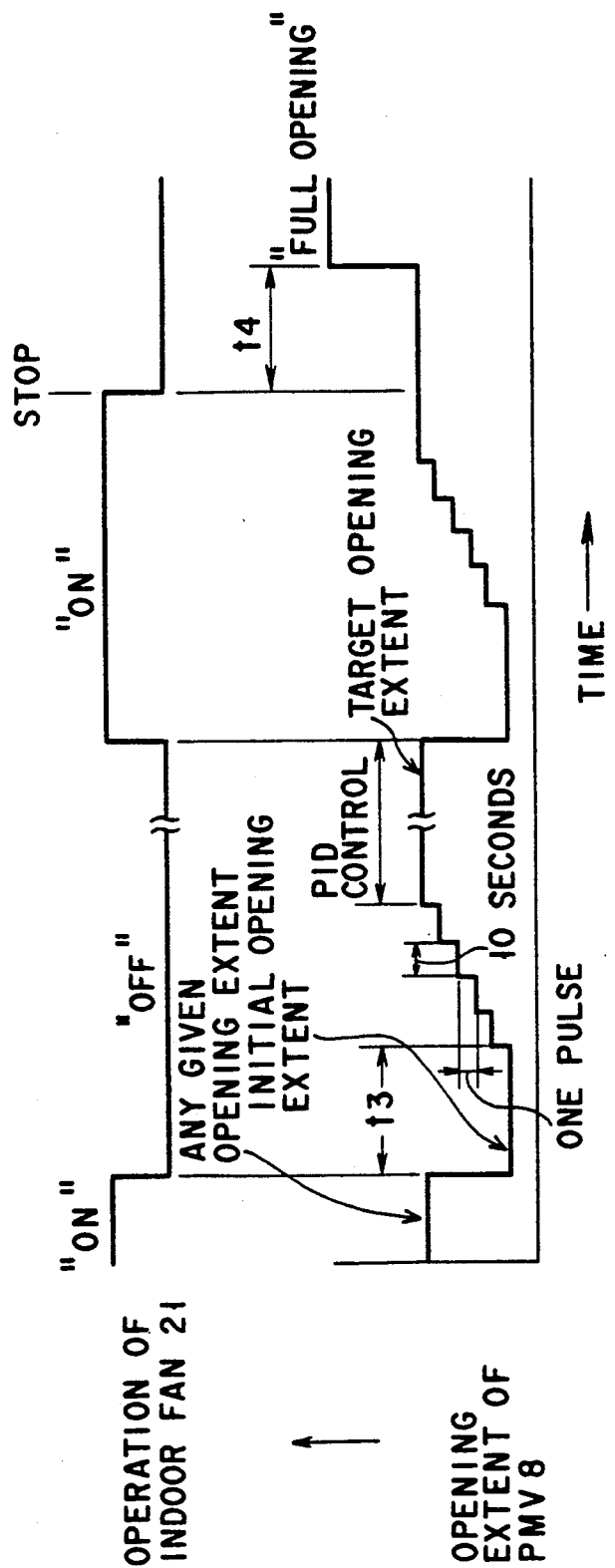
F I G. 8

|  | | | |
|---|---|---|---|
| +3.5 | RATHER FORCED-COOLING SIDE DEHUMIDIFYING (COMPRESSOR ↑ LARGE CAPACITY, INDOOR FAN ↑ MEDIUM SPEED) 20 | RATHER FORCED-COOLING SIDE DEHUMIDIFYING (COMPRESSOR ↑ LARGE CAPACITY, INDOOR FAN ↑ MEDIUM SPEED) 21 | RATHER FORCED-COOLING SIDE DEHUMIDIFYING (COMPRESSOR ↑ LARGE CAPACITY, INDOOR FAN ↑ MEDIUM SPEED) 22 | RATHER FORCED-COOLING SIDE DEHUMIDIFYING (COMPRESSOR ↑ LARGE CAPACITY, INDOOR FAN ↑ MEDIUM SPEED) 23 |
| +2.0 | RATHER FORCED-COOLING SIDE DEHUMIDIFYING (COMPRESSOR ↑ MEDIUM CAPACITY, INDOOR FAN ↑ LOW SPEED) 16 | RATHER FORCED-COOLING SIDE DEHUMIDIFYING (COMPRESSOR ↑ MEDIUM CAPACITY, INDOOR FAN ↑ LOW SPEED) 17 | RATHER FORCED-COOLING SIDE DEHUMIDIFYING (COMPRESSOR ↑ MEDIUM CAPACITY, INDOOR FAN ↑ LOW SPEED) 18 | RATHER FORCED-COOLING SIDE DEHUMIDIFYING (COMPRESSOR ↑ MEDIUM CAPACITY, INDOOR FAN ↑ LOW SPEED) 19 |
| +1.0 | RATHER FORCED-COOLING SIDE DEHUMIDIFYING (COMPRESSOR ↑ SMALL CAPACITY, INDOOR FAN ↑ VERY LOW SPEED) 12 | RATHER FORCED-COOLING SIDE DEHUMIDIFYING (COMPRESSOR ↑ SMALL CAPACITY, INDOOR FAN ↑ VERY LOW SPEED) 13 | RATHER FORCED-COOLING SIDE DEHUMIDIFYING (COMPRESSOR ↑ SMALL CAPACITY, INDOOR FAN ↑ VERY LOW SPEED) 14 | RATHER FORCED-COOLING SIDE DEHUMIDIFYING (COMPRESSOR ↑ SMALL CAPACITY, INDOOR FAN ↑ VERY LOW SPEED) 15 |

FIG. 11A

AIR CONDITIONING APPARATUS HAVING A DEHUMIDIFYING OPERATION FUNCTION

BACKGROUND OF THE INVENTION

1. Field of the Invention

The present invention relates to an air conditioning apparatus having a dehumidifying operation function for removing moisture in the indoor air.

2. Description of the Related Art

An air conditioning apparatus is known which is equipped with two indoor heat exchangers and an electric expansion valve through which these indoor heat exchangers are connected.

In this air conditioning apparatus, when the electric expansion valve is fully opened no pressure-reducing action is exerted on a refrigerant flowing between the indoor heat exchangers and, under this action, the respective indoor heat exchangers serves as one heat exchanger. When the extent of opening of the electric expansion valve is reduced a pressure-reducing action is exerted on the refrigerant flowing between the indoor heat exchangers and the respective indoor heat exchangers act as mutually different heat exchangers.

If, for example, the respective indoor heat exchangers are made to function both as evaporators with the electric expansion valve fully opened, it is possible to perform a cooling operation. If, on the other hand, the respective indoor heat exchangers are made to function both as condensers with the electric expansion valve fully opened, it is possible to perform a heating operation.

If, with the extent of opening of the electric expansion valve reduced, one of these indoor heat exchangers is made to function as the condenser (reheater) and the other indoor heat exchanger as the evaporator, then it is possible to perform a dehumidifying operation. Put it in another way, indoor air is cooled and dehumidified through the evaporator and, thereafter, reheated and blown into a room.

The air conditioning apparatus equipped with such a dehumidifying operation function is disclosed, for example, in Published Examined Japanese Patent Application No. 61-43631, Published Unexamined Japanese Patent Application Nos. 3-164666, 3-177755, 3-255861 and 2-203172 and Published Examined Japanese Utility Model Registration Application No. 62-40289.

At the dehumidifying operation time, an outdoor heat exchanger functions as a condenser. In cases where an amount of refrigerant heat released varies in the outdoor heat exchanger it is possible to control the air blown into the room, that is, the temperature in the dehumidified air.

In cases where the flow of the outdoor air into the outdoor heat exchanger is stopped with an outdoor fan OFF, the amount of refrigerant heat released is decreased in the outdoor heat exchanger. With a decrease the amount of refrigerant heat released, the temperature of the dehumidified air rises so that a dehumidifying operation is carried out on a somewhat "heating" side.

With the outdoor fan ON and its speed increased, more refrigerant heat is released in the outdoor heat exchanger. With an increase in the refrigerant heat released, the temperature of the dehumidified air is lowered and the dehumidifying operation is carried out on a somewhat "cooling" side.

In the dehumidifying operation with the outdoor fan kept ON, the liquefying of the refrigerant is stable in the outdoor heat exchanger in which case a liquid-phase refrigerant passes through the electric expansion valve between the respective indoor heat exchangers.

With the outdoor fan changed from an ON to an OFF state, on the other hand, the liquefying of the refrigerant becomes temporarily unstable in the outdoor heat exchanger in which case a gas-mixed refrigerant under a pressure ripple flows toward an indoor side and across the electric expansion valve. At that time, noise occurs upon mixing together of the liquid and gas refrigerants, thus imparting disturbing noise to an occupant or occupants in the room.

Even with the outdoor fan changed from an OFF to an ON state a similar phenomenon occurs, thus imparting a feeling of discomfort to the occupant in the room.

Even when a dehumidifying mode is used at a start of operation of the apparatus, the liquefying of the refrigerant becomes unstable in the outdoor heat exchanger so that a gas-mixed liquid refrigerant under a rippling pressure passes through the electric expansion valve at which time disturbing noise is produced.

SUMMARY OF THE INVENTION

It is accordingly the object of the present invention to provide an air conditioning apparatus which can prevent any disturbing refrigerant noise from being produced at a dehumidifying operation.

According to the present invention there is provided an air conditioning apparatus having a dehumidifying function, comprising:

a compressor for sucking, compressing and discharging a refrigerant;

an outdoor heat exchanger for making an exchange between refrigerant heat and outdoor air heat;

an outdoor fan for sending outdoor air to the outdoor heat exchanger;

a refrigerant heater for heating the refrigerant;

pressure reducing unit for reducing a refrigerant pressure;

a first indoor heat exchanger for making an exchange between the refrigerant heat and indoor air heat;

an electric expansion valve for allowing its extent of opening to be varied;

a second indoor heat exchanger for making an exchange between the refrigerant heat and indoor air heat;

an indoor fan for circulating the indoor air through second and first indoor heat exchangers;

a control unit for enabling the refrigerant which is discharged from the compressor to be returned back to the compressor through the outdoor heat exchanger, pressure reducing unit, first indoor heat exchanger, electric expansion valve and second indoor heat exchanger and for fully opening the electric expansion valve and performing a cooling operation;

a control unit for enabling the refrigerant which is discharged from the compressor to be returned back to the compressor through the outdoor heat exchanger, refrigerant heater, first indoor heat exchanger, electric expansion valve and second indoor heat exchanger and for enabling the opening extent of the electric expansion valve to be reduced to a target opening level and a dehumidifying operation to be performed;

a control unit for controlling, at the time of dehumidifying operation, at least one of the operation of the outdoor fan and that of the refrigerant heater to adjust the temperature of air blown into a room; and a control unit for, when during the dehumidifying operation the outdoor fan is rendered from an OFF to an ON state and from the ON to the OFF state, setting the opening extent of the electric expansion valve first to an initial opening level and then gradually varying the initial opening level toward the target opening level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A and 6B are a graph showing the condition under which a dehumidifying operation mode is selected in the first embodiment;

FIG. 8 is a time chart showing a relation of the extent of opening of the electric expansion valve to the operation of an outdoor fan at the dehumidifying operation time in the first embodiment;

FIGS. 11A and 11B are a graph showing the condition under which a dehumidifying operation mode is selected in the second embodiment.

DETAILED DESCRIPTION OF THE PREFERRED EMBODIMENT

The first embodiment of the present invention will be explained below with reference to the accompanying drawings.

Figure 1:
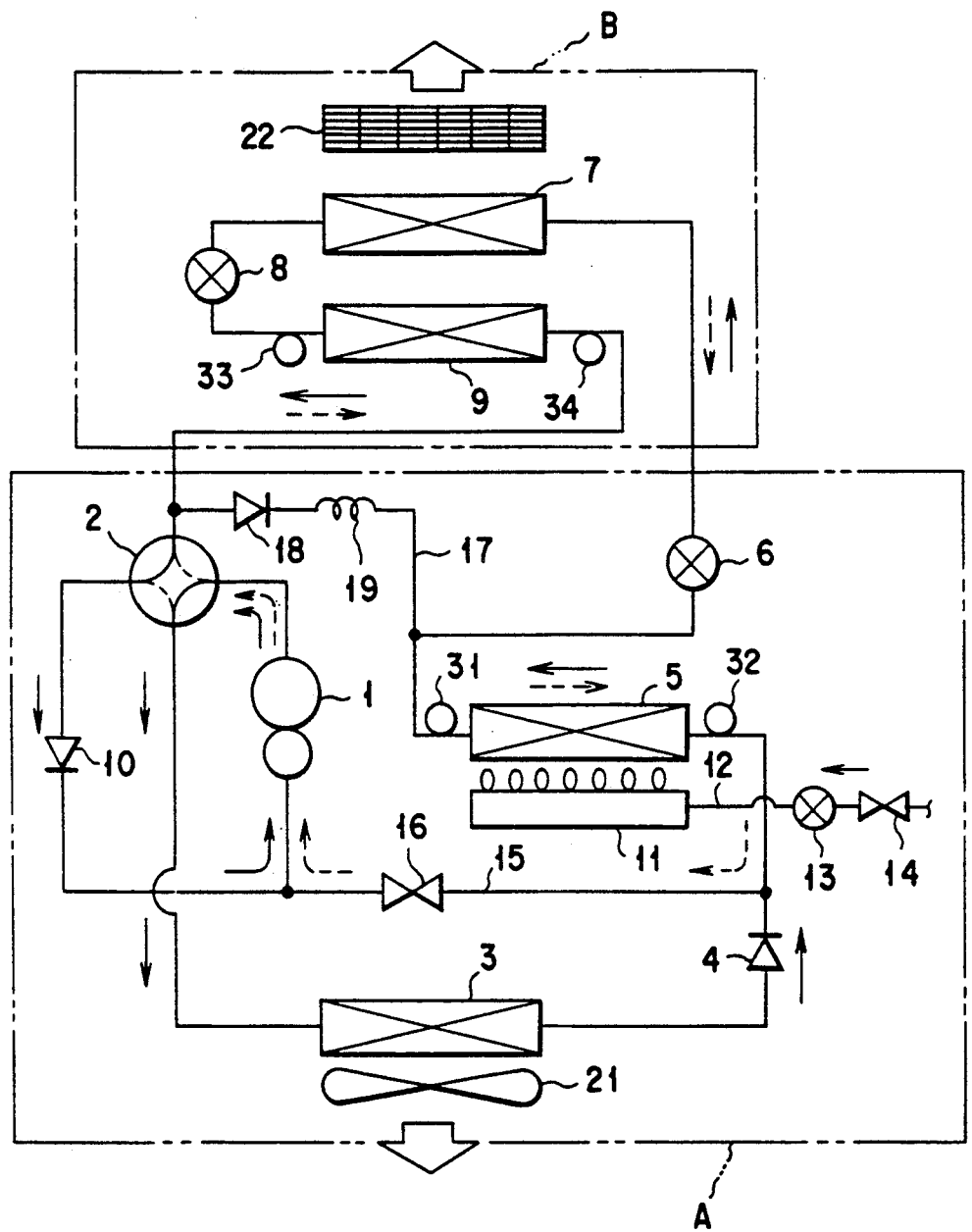
FIG. 1 is a block diagram showing the arrangement of a refrigerating cycle of an air conditioning apparatus according to the first embodiment of the present invention.

In FIG. 1, a compressor 1 sucks, compresses and discharges a refrigerant. An outdoor heat exchanger 3 is pipe-connected to a discharge outlet of the compressor 1 via a four-way valve 2. The outdoor heat exchanger 3 allows an exchange to be made between refrigerant heat and outdoor air heat. A refrigerant heater 5 is connected via a check valve 4 to the outdoor heat exchanger 3.

The refrigerant heater 5 is equipped with a gas burner 11 which is connected via a fuel pipe 12 to a fuel supply source (not shown). A proportional valve 13 and two-way valve 14 are arranged on the fuel pipe 12.

The proportional control valve 13 has its opening extent continuously varied in proportion to an input voltage level.

A first indoor heat exchanger 7 is pipe-connected to the refrigerant heater 5 through a pressure-reducing means, such as an electric expansion valve 6, for reducing refrigerant pressure. The first indoor heat exchanger 7 allows an exchange to be made between the refrigerant heat and an indoor air heat.

A second indoor heat exchanger 9 is pipe-connected to the first indoor heat exchanger 7 through an electric expansion valve 8. The suction inlet of the compressor 1 is connected by pipes to the second indoor heat exchanger 9 through the four-way valve 2 and check valve 10.

The electric expansion valves 6 and 8 are each comprised of a pulse motor valve and have their opening extent varied in accordance with the number of drive pulses supplied. Hereinafter, the electric expansion valve is referred to simply as a PMV.

One end of a bypass pipe 15 is connected to a pipe between the check valve 4 and the refrigerant heater 5 and the other end of the bypass pipe 15 is connected to the suction inlet of the compressor 1. A two-way valve 16 is arranged on the bypass pipe 15. One end of a bypass pipe 17 is connected to a pipe between the four-way valve 2 and the second indoor heat exchanger 9 and the other end of the bypass pipe 17 is connected to a pipe between the refrigerant heater 5 and the electric expansion valve 6. A check valve 18 and capillary tube 19 are arranged on the bypass pipe 17.

An outdoor fan 21 is provided at an air passage to the outdoor heat exchanger 3. The outdoor fan 21 supplies the outdoor air to the outdoor heat exchanger 3 to provide a continuous speed variation. As a motor for the outdoor fan 21 use is made of a DC motor for varying its speed by the level adjustment of a drive voltage or an AC motor for varying its speed by the phase control of a drive voltage.

An indoor fan 22 is provided in an air passage to the indoor heat exchangers 7 and 9 to allow the indoor air to be circulated via the indoor heat exchangers 7 and 9.

A pair of refrigerant temperature sensors 31, 32 are provided one at each end side of the refrigerant heater 5. A pair of refrigerant temperature sensors 33, 34 are provided one at each end side of the indoor heat exchanger 9.

It is to be noted that A and B represent the outdoor and the indoor unit, respectively.

Figure 2:
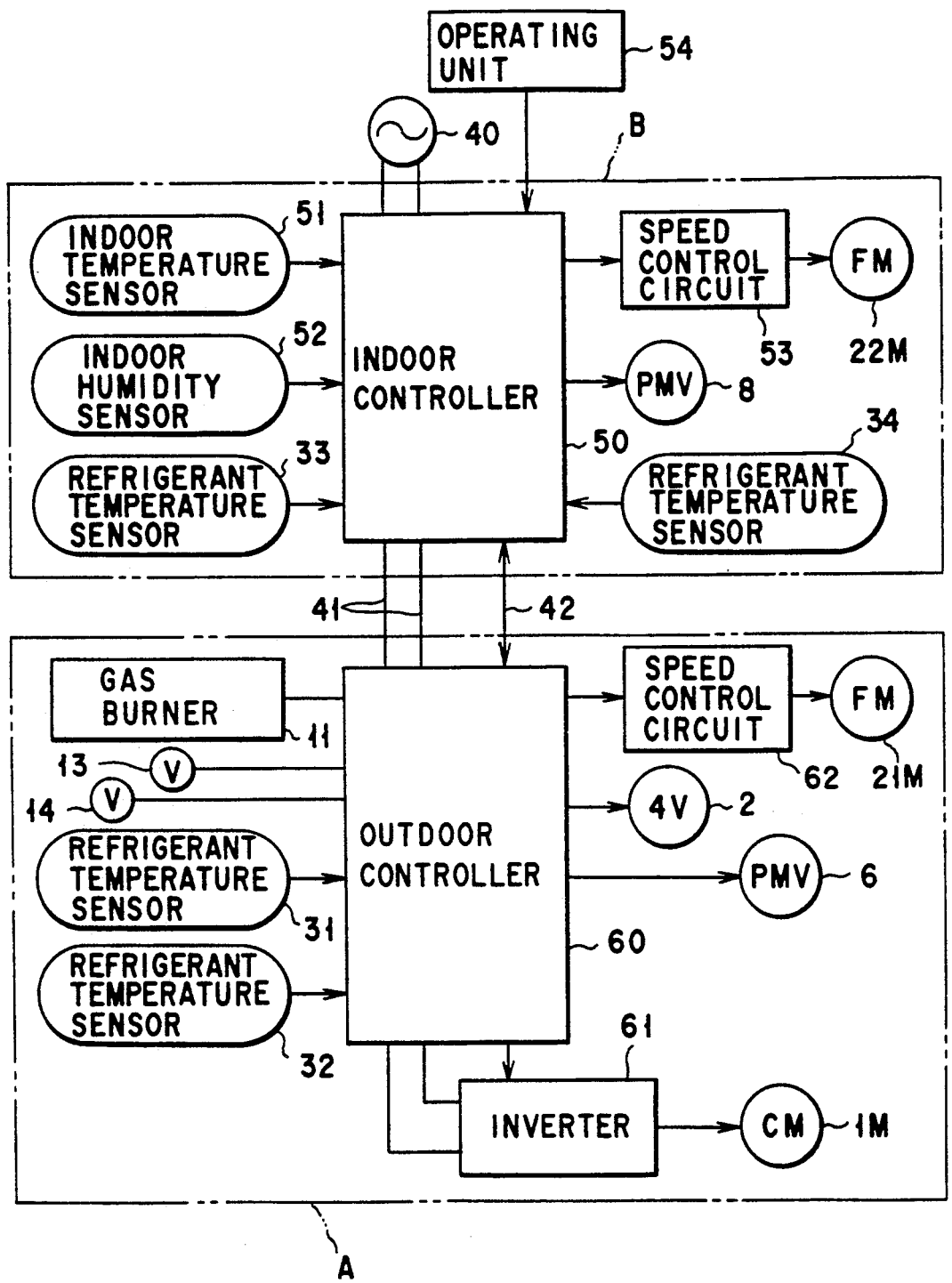
FIG. 2 is a block diagram showing the arrangement of a control circuit of the first embodiment.

The arrangement of a control circuit in the apparatus is shown in FIG. 2.

An indoor controller 50 is connected to a commercial AC power supply 40. An outdoor controller 60 is connected to the indoor controller 50 via power lines 41 and serial signal line 42. A serial signal line 42 is provided for power supply voltage synchronizing data transfer.

To the indoor controller 50 are connected an indoor temperature sensor 51, indoor humidity sensor 52, speed control circuit 53, remote control type operating unit 54, PMV8 and refrigerant temperature sensors 33 and 34.

The indoor temperature sensor 51 detects a temperature Ta of the indoor air and the indoor humidity sensor 52 detects a humidity Ha of the indoor air.

The operating unit 54 sets various operation conditions. The speed control circuit 53 controls the speed of a motor 22M in the indoor fan 22.

To the outdoor control unit 60 are connected an inverter 61, speed control circuit 62, four-way valve 2, PMV6 and refrigerant temperature sensors 31 and 32. To the outdoor control unit 60 are further connected the gas burner 11 for the refrigerant heater 5, proportional control valve 13 and two-way valve 14.

The inverter 61 rectifies a commercial AC power supply voltage and converts it to a frequency (and level) voltage corresponding to an instruction from the outdoor controller 60 so that it is delivered as an output. This output serves as an electric drive power for a motor 1M in the compressor 1. That is, with an increase in the output frequency F of the inverter 61 the compressor 1 is increased in its capacity. The speed control circuit 62 controls the speed of a motor 21M in the outdoor fan 21.

The indoor controller 50 and outdoor controller 60 are comprised of a microcomputer and peripheral circuits and have function means as will be set out below.

[1] a means for returning a refrigerant from the compressor 1 back to the compressor 1 through the four-way valve 2, outdoor heat exchanger 3, check valve 4, refrigerant heater 5, PMV6, first indoor heat exchanger 7, PMV8, second indoor heat exchanger 9, four-way valve 2 and check valve 10 and for fully opening PMV8 with the opening extent of PMV6 reduced, for turning off the operation of the refrigerant heater 5 and for implementing a cooling operation.

[2] a means for switching the four-way valve 2, for returning a refrigerant which is discharged from the compressor 1 back to the compressor 1 through the four-way valve 2, second indoor heat exchanger 9, PMV8, first indoor heat exchanger 7, PMV6, refrigerant heater 5 and bypass pipe (two-way valve 16 is opened), for fully opening PMV8 with the opening extent of PMV6 reduced, for turning on the operation of the refrigerant heater 5 and for implementing a heating operation.

[3] a means for finding, as a refrigerant superheat level, a difference at a heating operation time between the temperature of a refrigerant flowing out of the refrigerant heater 5, that is, the detected temperature of the refrigerant temperature sensor, on one hand, and the temperature of the refrigerant entering the refrigerant heater 5, that is, the detected temperature of the refrigerant temperature sensor 31, on the other hand, and for adjusting an amount of heating by the refrigerant heater 5, that is, the opening extent of the proportional control valve 13.

[4] a means for returning a refrigerant which is discharged from the compressor 1 back to the compressor 1 through the four-way valve 2, outdoor heat exchanger 3, check valve 4, refrigerant heater 5, PMV6, first indoor exchanger 7, PMV8, second indoor heat exchanger 9, four-way valve 2 and check valve 10 and for fully opening PMv6 and reducing the opening extent of PMV8 to a predetermined target level and for implementing a dehumidifying operation.

[5] a means for, at a dehumidifying operation time, controlling at least one of an operation of the indoor fan 21 and operation of the refrigerant heater 5 and for adjusting air blown into the room, that is, the temperature of dehumidifying air.

[6] a means for, when during a dehumidifying operation the outdoor fan 21 is placed from an OFF to an ON state or from the ON to the OFF state, setting type opening extent of PMV8 first to an initial opening level and gradually varying the aforementioned target opening level.

[7] a means for performing a cooling operation for the first predetermined time period when an operation mode at the start of operation is in a dehumidifying mode.

Figure 3A:
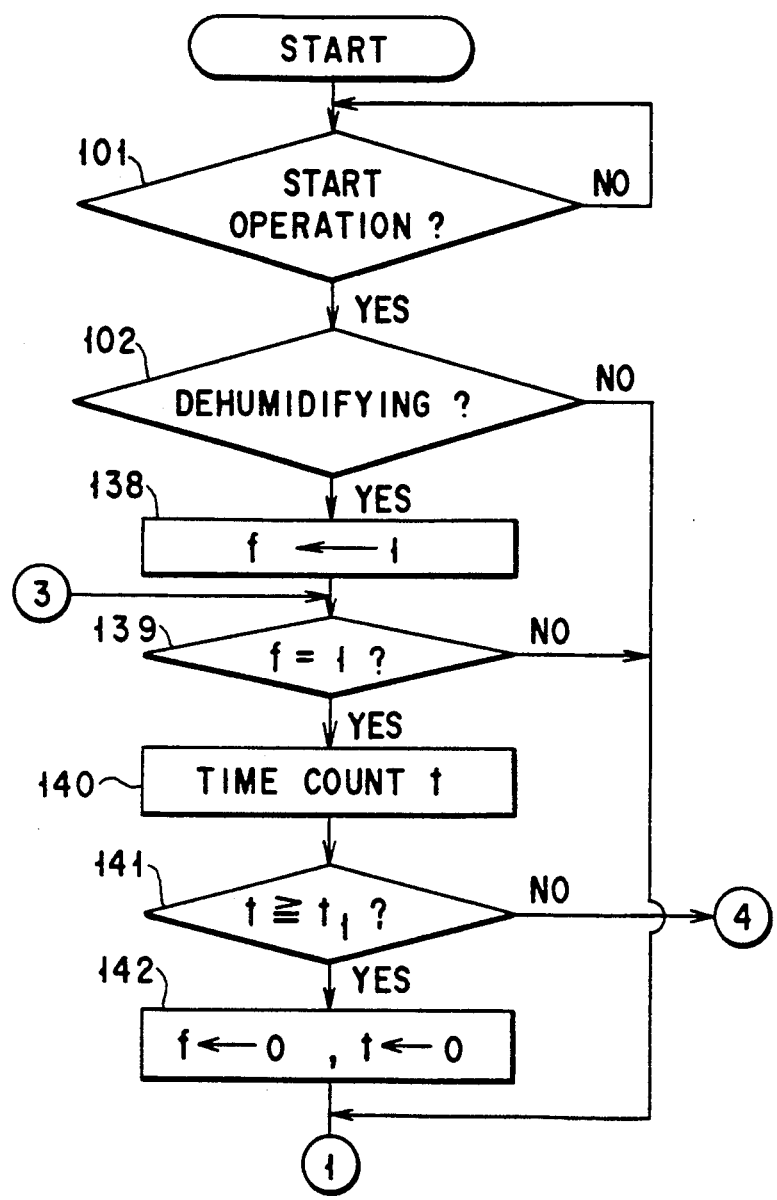
FIGS. 3A to 3C show a flowchart for explaining the operation of the first embodiment.
Figure 3B:
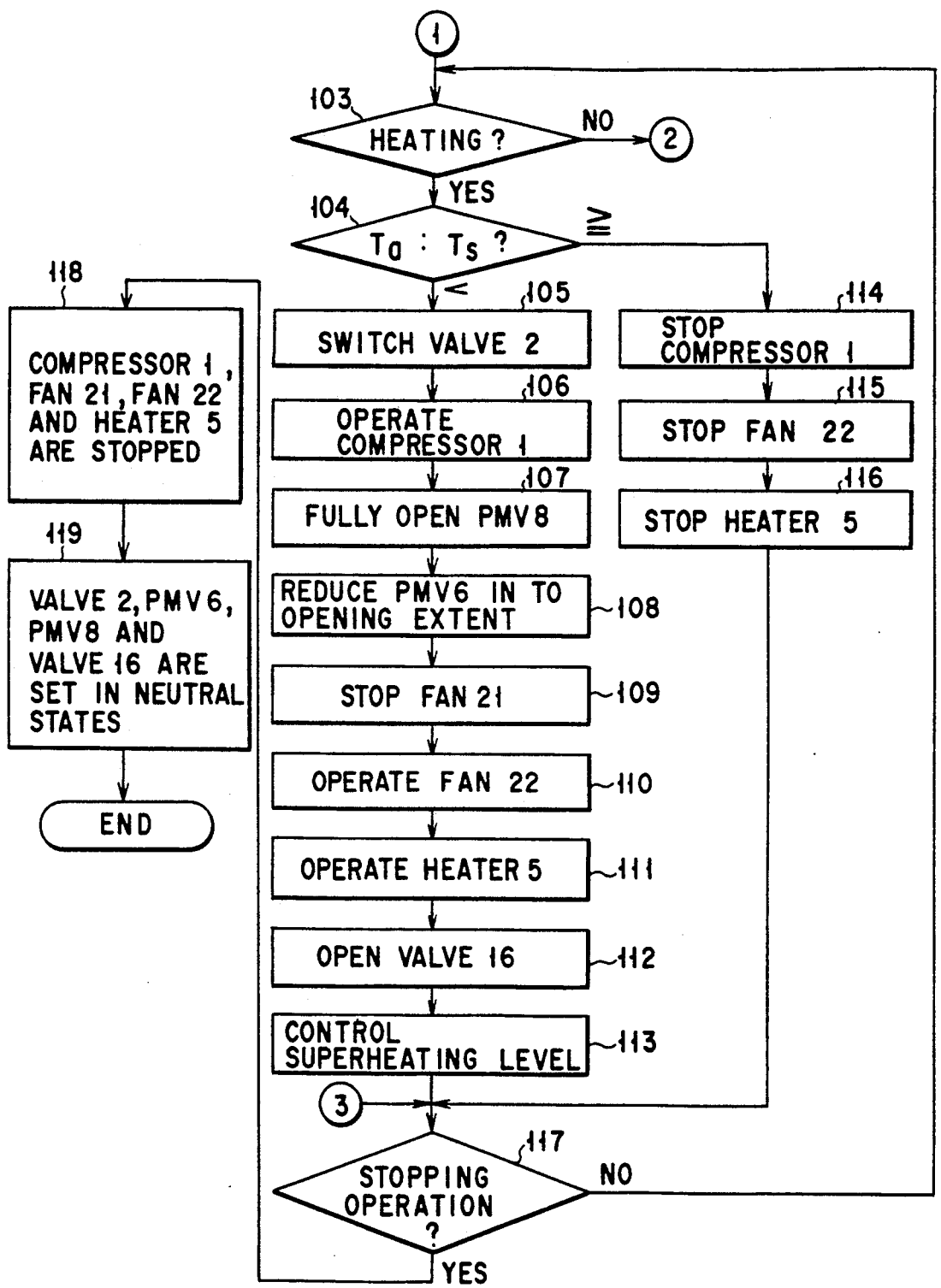
Figure 3C:
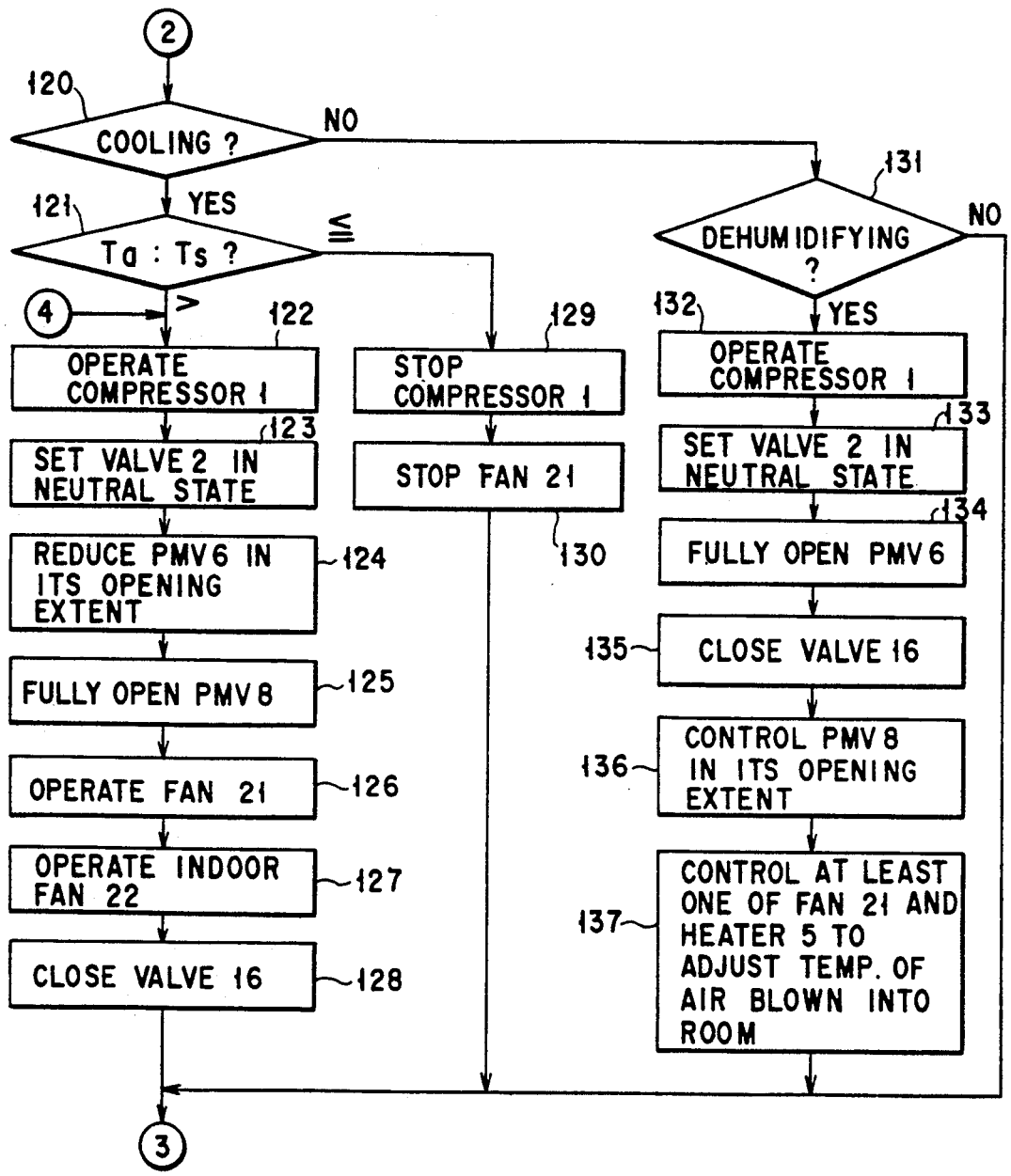

The operation of the apparatus thus arranged will be explained below with reference to FIGS. 3A to 3C.

The operating unit 54 sets the room to a desired indoor temperature level Ts and performs a start operation (step 101). Hereinafter the desired temperature level Ts is referred to as a set temperature level.

At this time, if the heating operation mode is set by the operating unit 54 (NO in step 102, YES in step 103), comparison is made between the set temperature level Ts and an indoor air temperature Ta detected at the indoor temperature sensor 51 (step 104). When the indoor air temperature Ta is set to be lower than the set valve Ts (Ta<Ts), then the four-way valve is switched, the compressor 1 operated, PMV8 fully opened, PMV6 reduced in its opening extent, outdoor fan 21 stopped, indoor fan 22 operated, refrigerant heater 5 operated (gas burner 11 ignited) and two-way valve 16 opened (steps 105 to 112).

As indicated by broken-line arrows in FIG. 1, a refrigerant is discharged from the compressor 1 and enters the second indoor heat exchanger 9 through the four-way valve 2. The refrigerant entering the second indoor heat exchanger 9 also enters the first indoor heat exchanger 7 past PMV8 in a fully-opened state. In the indoor heat exchangers 9 and 7, the refrigerant releases heat into the air of the room and is liquefied.

The refrigerant passing through the indoor heat exchanger 9, being so pressured-reduced as to be liable to be liquefied through PMV6, enters the refrigerant heater 5 where the refrigerant takes in combustion heat over the gas burner 11 and is liquefied. The refrigerant coming from the refrigerant heater 5 is sucked into the compressor 1 past the bypass pipe 15. In this way, a heating cycle is created.

As will be seen from the above, the indoor heat exchangers 9 and 7 function both as a condenser and the refrigerant heater 5 as an evaporator. In this way, the air of the room is heated.

At a time of heating operation, the temperature of the refrigerant entering the refrigerant heater 5 is detected by the refrigerant temperature sensor 31. The temperature of the refrigerant coming from the refrigerant heater 5 is detected by the refrigerant temperature sensor 32. The detected temperature of the refrigerant temperature sensor 31 is subtracted from the detected temperature of the refrigerant temperature sensor 32 whereby the superheat level of the refrigerant in the refrigerant heater 5 is detected. In order to make the superheat level constant the amount of heating by the refrigerant heater 5 is controlled at a step 113.

When the indoor air temperature Ta rises to the set temperature level Ts or more (Ta≧Ts in step 104), the compressor 1 is stopped, the indoor fan 22 stopped and the refrigerant heater 5 stopped (step 114 to 116). Hence the heating operation is interrupted.

When the indoor air temperature Ta is lower than the set temperature level Ts (Ta<Ts in step 104), the heating operation is restarted.

When the operating unit 54 is stopped (YES in step 117), the compressor 1 is stopped, the outdoor fan 21 stopped, the indoor fan 22 stopped and the refrigerant heater 5 stopped (step 118). Further the four-way valve 2, PMV6, PMV8 and two-way valve 16 are set in a neutral state (step 119). Hence the heating operation is stopped.

At the time of heating operation, part of a hot refrigerant discharged from the compressor 1 is sent via the bypass pipe 17 to the refrigerant heater 5 so that the temperature on the inlet side of the refrigerant heater 5 is raised. By so doing, there occurs no formation of dew on the inside surface of the refrigerant heater 5 and hence no formation of rust on the refrigerant heater 5.

Let it be assumed that a cooling operation mode is set by the operating unit 54 (YES in step 120).

In this case, when the indoor air temperature Ta, detected by the indoor temperature sensor 51 is set to be higher than the set temperature level Ts (Ta>Ts, step 121), then the compressor 1 is operated, the four-way valve 2 set in a neutral state, PMV6 reduced in its opening extent, PMV8 fully opened, the outdoor fan 21 operated, the indoor fan 22 operated and the two-way valve 16 closed (steps 122 to 128).

As indicated by the solid arrows in FIG. 1, the refrigerant is discharged from the compressor 1 past the four-way valve 4 into the outdoor heat exchanger 3 where the refrigerant releases its heat into the air of the room and is liquefied. The refrigerant coming from the outdoor heat exchanger 3 is supplied via the check valve 4 and the refrigerant heater 5 in an operation OFF state to PMV6, where it is so pressure-reduced as to be readily liable to be liquefied, and from there to the first indoor heat exchanger 7. The refrigerant entering the first indoor heat exchanger 7 is also supplied to the second indoor heat exchanger 9 past PMV8 in a fully opened state. In the indoor heat exchangers 7 and 9, the refrigerant robs heat of the room air and is liquefied. The liquefied refrigerant coming from the indoor heat exchanger 9 is sucked into the compressor 1 past the four-way valve 2 and check valve 10. A cooling cycle is created in this way.

Thus the outdoor heat exchanger 3 functions as a condenser and the indoor heat exchangers 7 and 9 both as evaporators whereby the room is cooled.

When the indoor air temperature Ta is made equal to or lower than the set temperature level (Ta≦Ts, step 121) then the compressor 1 is stopped and the outdoor fan 21 is stopped (steps 129, 130). As a result, the cooling operation is interrupted.

When the indoor air temperature Ta goes higher than the set temperature level Ts (Ta>Ts in step 121), the cooling operation is restarted.

Let it be assumed that a dehumidifying operation mode is set by the operating unit 54 (YES in step 131).

Figure 4:
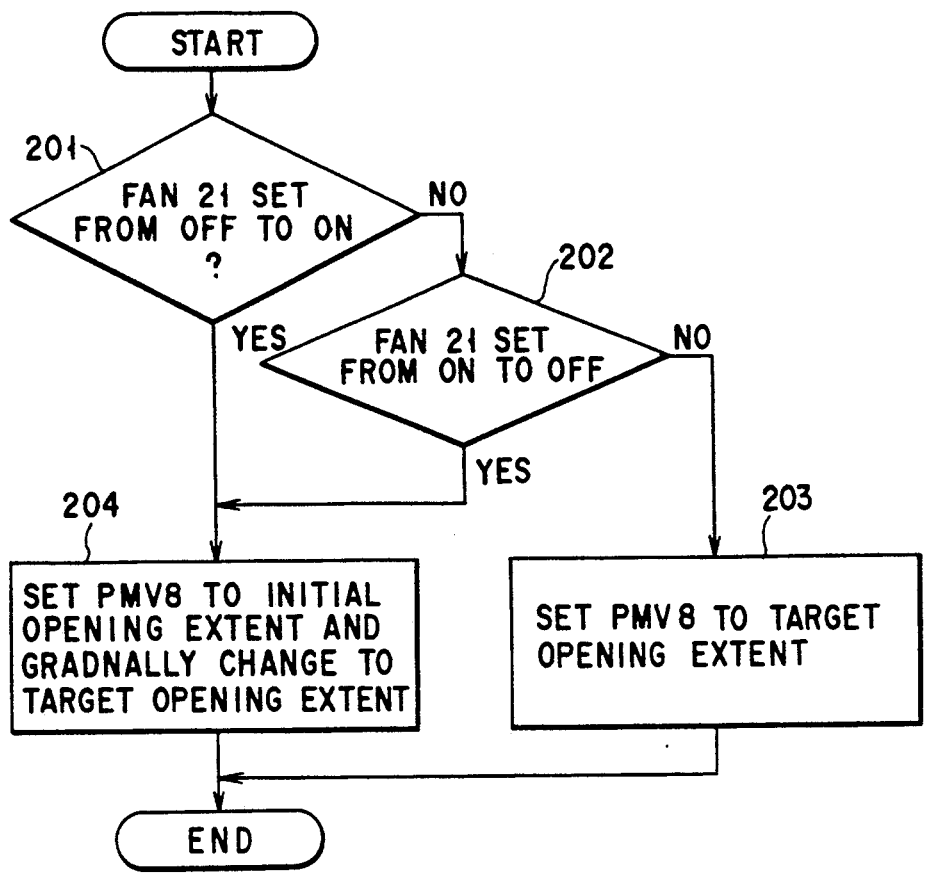
FIG. 4 is a flowchart for explaining the control of an electric expansion valve in the first embodiment during dehumidifying operation.

In this case, the compressor 1 is operated, the four-way valve 2 set in a neutral state, PMV6 fully opened and the two-valve 16 closed (steps 132 to 135). PMV8 controls the opening extent of PMV8 (step 136). One routine of control of step 136 is shown in FIG. 4 and the opening extent of PMV8 is reduced to a target level (step 203).

As indicated by solid arrows in FIG. 1, a refrigerant which is discharged from the compressor 1 is sucked into the compressor 1 through the four-way valve 2, outdoor heat exchanger 3, check valve 4, refrigerant heater 5, PMV6, first indoor heat exchanger 7, PMV8, second indoor heat exchanger 9, four-way valve 2 and check valve 10.

In this case, the flow of the refrigerant is the same as that involved at the time of cooling operation. With PMV6 fully opened and PMV8 reduced in its opening extent, the outdoor heat exchanger 3 and first indoor heat exchanger 7 function both as condensers (reheaters) and the second indoor heat exchanger 9 as an evaporator.

To be specific, the air in the room is cooled and dehumidified by the second indoor heat exchanger 9, reheated by the first indoor heat exchanger 7 and discharged as dehumidified air into the room.

At the time of dehumidifying operation, at least one of the operation of the outdoor fan 21 and operation of the refrigerant heater 5 is controlled in accordance with an indoor air temperature Ta detected by the indoor temperature sensor 51 and indoor air humidity Ha detected by the indoor humidity sensor 52. By so doing, the temperature of the dehumidified air is adjusted at step 137.

Figure 6B:
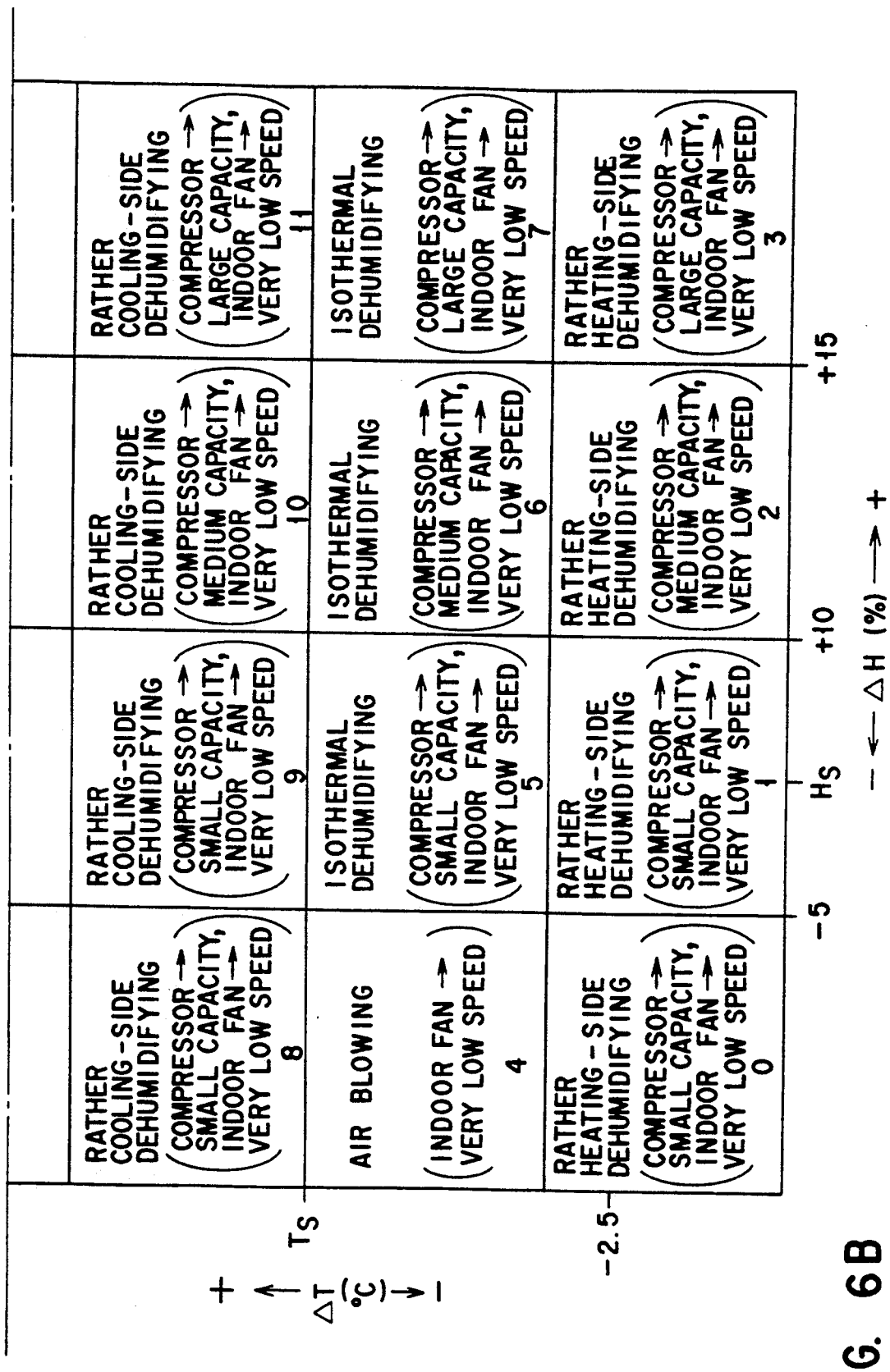

To be specific, a difference $\Delta T$ between the indoor air temperature Ta and the set temperature level Ts and difference $\Delta H$ between the indoor air humidity Ha and the set level Hs are found and any one of a rather forced-cooling side dehumidifying operation, rather cooling-side dehumidifying operation, isothermal dehumidifying operation, air blowing operation and rather heating-side dehumidifying operation is selectively performed according to how both the differences belong to any particular one of a plurality of zones in FIGS. 6A and 6B.

Put it in another way, the rather heating-side dehumidifying operation at a zone "0" is selected when the difference $\Delta T$ and $\Delta H$ are set to below $-2.5°$ C. and below $-5\%$, respectively, with the indoor air temperature Ta set low.

The rather forced-cooling side dehumidifying operation at a zone "18" is selected when the differences $\Delta T$ and $\Delta H$ are set to $+2°$ C. to $+3.5°$ C. and $+10\%$ to $+15\%$, respectively, with the indoor air temperature Ta set high.

In the rather heating-side dehumidifying operation at zones "0", "1", "2" and "3", the outdoor fan 21 is turned OFF and the refrigerant heater 5 is turned ON in a very small amount of heating. In this case, the outer air does not pass through the outdoor heat exchanger 3 and hence no heat is released from the refrigerant in the outdoor heat exchanger 3. The less the heat the more the amount of heat applied to the indoor heat exchanger (reheater) 7.

It is to be noted that the compressor 1 is set to be small in capacity at the zones "0" and "1", intermediate in capacity at the zone "2" and greater in capacity at the zone "3". Further, the indoor fan 22 is operated at low speeds in the zones "0", "1", "2" and "3".

In the air blowing operation at the zone "4" the indoor fan 22 is operated at a very low speed.

In the isothermal dehumidifying operation at the zones "5", "6" and "7" the outdoor fan 21 is operated at a low speed and the refrigerant heater 5 is turned ON in a very small amount of heat. In this case, the outdoor fan 21 is turned ON, heat is released from the refrigerant in the outdoor heat exchanger 3 and less heat is applied to the reheater (first indoor heat exchanger 7) by that heat extent. Thus the temperature of the dehumidified air becomes equal to the indoor air temperature.

It is to be noted that the compressor 1 is small in capacity at the zone "5", intermediate in capacity at the zone "6" and greater in capacity at the zone "7". Further, at all these zones "5", "6" and "7" the indoor fan 22 is operated at low speeds.

In the rather cooling-side operation at the zones "8", "9", "10" and "11", the outdoor fan 21 is operated in intermediate speed and the refrigerant heater 5 is turned OFF. In this case, more heat is released from the refrigerant in the outdoor heat exchanger 3 and less combustion heat is involved in the refrigerant heater 5 and hence less heat is applied to the reheater (first indoor heat exchanger 7). As a result, the temperature of the dehumidified air is made lower than the indoor air temperature Ta.

It is to be noted that the compressor 1 is set small in capacity at the zones "8" and "9", intermediate at the zone "10" and great at the zone "11". Further, the indoor fan 22 is operated at low speeds at all these zones "8", "9", "10" and "11".

In the rather forced-cooling side dehumidifying operation at the zone 12 through the zone "23", the outdoor fan 21 is operated at high speeds and the refrigerant heater 5 is turned OFF. In this case, heat applied to the reheater (first indoor heat exchanger 7) becomes very small. As a result, the temperature of the dehumidified air is becoming smaller than the indoor air temperature Ta.

It is to be noted that the compressor 1 is set smaller in capacity at the zones "12" to "15", intermediate at the zones "16" to "19" and great at the zones "20" to "23" and that the indoor fan 22 is operated in a very slow speed mode at the zones "12" to "15", in a slow speed mode at the zones "16" to "19" and a medium speed mode at the zones 20 to 23.

The relation of the operation states of the outdoor fan 21 and refrigerant heater 5 to their dehumidifying operations is tabulated as follows:

|  | outdoor fan 21 | refrigerant heater 5 |
| --- | --- | --- |
| rather forced-cooling side dehumidifying | high-speed operation | OFF |
| rather cooling-side dehumidifying | medium-speed operation | OFF |
| isothermal dehumidifying | low-speed operation | ON |
| rather heating-side dehumidifying | OFF | ON |

At tabulated in the following table, the set level Hs is determined in accordance with the set level Ta. Two set levels (values) are set: a set level Hsa selected when a normal operation mode is determined in a normal capacity by the operating unit 54 and a set level $H_{sb}$ selected when a high-capacity powerful operation mode is determined by the operating unit 54. To be specific, for the set level Ts being 22° C., 60% is selected as the set level $H_s$ in the normal operation mode and 35% as the set level $H_s$ in the powerful operation mode.

| $T_s$ (°C.) | $H_{sa}$ (%) | $H_{sb}$ (%) |
| --- | --- | --- |
| 17 to 21 | 65 | 35 |
| 22 to 26 | 60 | 35 |
| 27 to 28 | 55 | 35 |
| 29 to 30 | 50 | 30 |

At the respective zones, control is shifted, during the dehumidifying operation, in accordance with the indoor air temperature Ta and indoor air humidity Ha, but, upon shifting, control is implemented sequentially through the respective adjacent zones.

Figure 7:
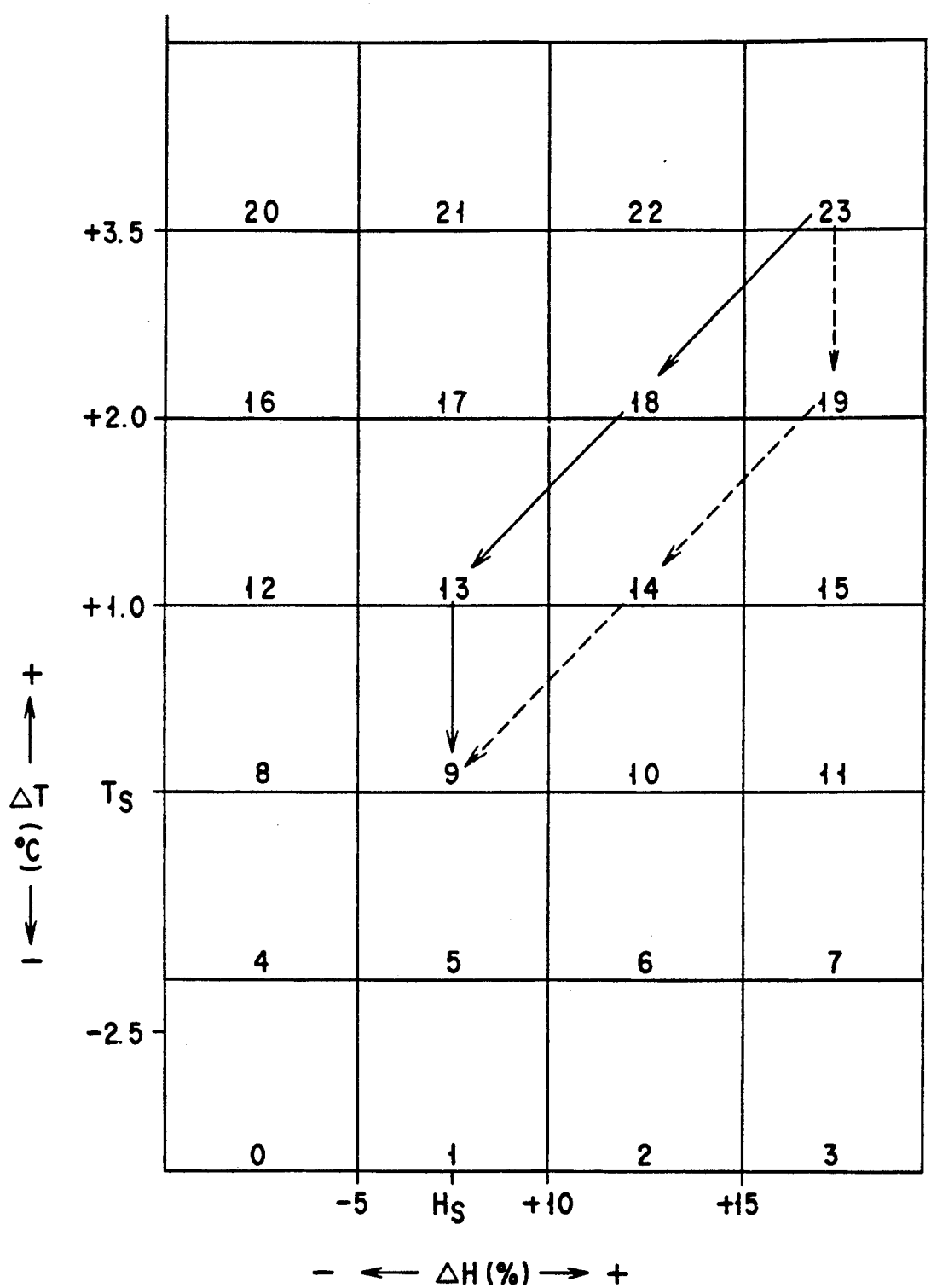
FIG. 7 is a graph showing the mode selection route in FIGS. 6A and 6B.

During control of the zone "23", for example, when the control condition of the zone "9" is established, if the control of the zone "23" passes a set time $t_1$ from its implementation time, control is shifted sequentially, in increments of time $t_1$, from the zone "23" to the zone "9" in a mutually adjacent direction as indicated by solid arrows in FIG. 7, that is, from the zone "23" to the adjacent zone "18" first at a time $t_1$, from there to the adjacent zone "13" at a time $t_1$ and from there to the zone "9".

It is to be noted that control may be shifted from the zone 23 to the zone 9 along a path as indicated by broken-line arrows, that is, from the zone "23" to the adjacent zone at a time $t_1$, from there to the adjacent zone "14" at a time $t_1$ and to the zone "9".

Thus during dehumidifying operation the temperature of the dehumidified air is adjusted in accordance with the indoor air temperature Ta and indoor air humidity Ha and, by so doing, the indoor air temperature Ta and indoor air humidity Ha can reach the set values Ts and Hs so that a comfortable circumstance is maintained in the room. Control is performed sequentially in a mutually adjacent direction from one zone to another zone to secure more and more comfortable circumstance.

Further there is no need to create a heating cycle and a rather heating-side dehumidifying operation can be carried out without involving any refrigerant noise when the four-way valve 2 is switched.

Upon shifting from the rather heating-side dehumidifying operation to the isothermal dehumidifying operation, the outdoor fan 21 is switched over from OFF to ON. When, on the other hand, shifting is made from the isothermal dehumidifying operation to the rather heating-side dehumidifying operation, the outdoor fan 21 is changed over from ON to OFF at which time the liquefying of the refrigerant temporarily becomes stable in the outdoor heat exchanger 3.

If this is the case, then there is a fear that a gas-mixed liquid refrigerant under a ripple pressure will flow toward the room side and that disturbing noise will occur upon mixing of the gas refrigerant and liquid refrigerant.

As indicated in FIG. 4 showing one routine of control (opening extent control of PMV8) at step 136, PMV8 has its opening extent first set to an initial opening level when the outdoor fan 21 is turned from OFF to ON (YES at step 201) and from ON to OFF (YES at step 202). Given that the "full opening" state corresponds to 256 drive pulses, the initial opening level corresponds to, for example, 46 drive pulses, a level smaller than the target opening level.

The relation of the driving of the outdoor fan 21 to a change in the opening extent of PMV8 is shown in FIG. 8.

With the opening extent of PMV8 reduced to its initial opening level, a refrigerant pressure goes high in the first indoor heat exchanger (reheater) 7. Then the supercooling of the refrigerant is promoted in the first indoor heat exchanger 7, thus allowing the liquid refrigerant only to flow into PMV8. Therefore, no disturbing noise is produced.

When a time $t_3$ is passed after the opening extent of PMV8 has been set to the initial opening level, the opening extent of PMV8 is gradually increased toward the target opening level at a rate of one pulse per 10 seconds.

An adequate supercooling operation is maintained in the first outdoor heat exchanger 7 by gradually varying the opening extent of PMV8. This can attain a gas-mixed liquid refrigerant flow into PMV8 to the lowest possible extent, thus preventing disturbing refrigerant noise.

When the opening extent of PMV8 reaches the target opening level, it is PID-controlled so as to set, to a constant level, a difference between the temperature (the detected temperature of the refrigerant temperature sensor 34) of the refrigerant leaving the second indoor heat exchanger 9 and the temperature (the detected temperature of the refrigerant temperature sensor 33) of the refrigerant entering the second indoor heat exchanger 9 serving as the evaporator in this case. PID-control as set out above maintains, at a constant level, a superheating of the refrigerant in the second indoor heat exchanger 9, noting that PID emerging in the present specification is referred to as a proportional, integration and differential.

Figure 5:
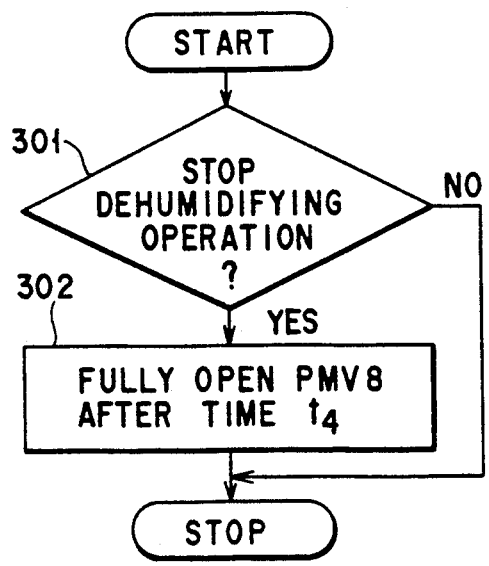
FIG. 5 is a flowchart for explaining the control of the electric expansion valve in the first embodiment at the time of stopping the dehumidifying operation.

At the stopping of the dehumidifying operation, as shown in FIG. 5, PMV8 is not immediately put in a fully opened (neutral) state and is fully opened after time $t_4$ following a stopping time $t_4$—steps 301 and 302. A pressure balance between the refrigerant entering PMV8 and that leaving PMV8 is obtained by securing the time $t_4$, so that it is possible to prevent the refrigerant from flowing into PMV8 at a dash. It is possible to avoid the generation of disturbing refrigerant noise.

It may be possible to, without securing the time $t_4$, gradually increase the opening extent of PMV8 until a fully opened state is reached. In this case, a quick pressure balance is created between the refrigerant entering PMV8 and the refrigerant leaving PMV8, thereby shortening the time for PMV8 to reach a fully opened state.

When, on the other hand, the operation mode at the start of operation is set to a dehumidifying operation mode, the liquefying of the refrigerant in the outdoor heat exchanger 3 becomes unstable, thus there being a fear that disturbing noise will be produced.

In cases where the operation mode at the start of operation is a dehumidifying mode, a cooling operation is implemented only at a given initial time period $t_1$ only.

Put it in another way, when the operating unit 54 is set to the dehumidifying operation and starting operation is performed (YES in step 101, YES in step 102), a flag f is set to "1", starting a time count t. PMV6 has its opening extent reduced until the time count t reaches a predetermined time $t_1$ (steps 139, 140, 141). This fully opens PMV8 and restricts the opening extent of PMV6, thus implementing a cooling operation in a forced-cooling mode (steps 122 to 128).

Figure 9:
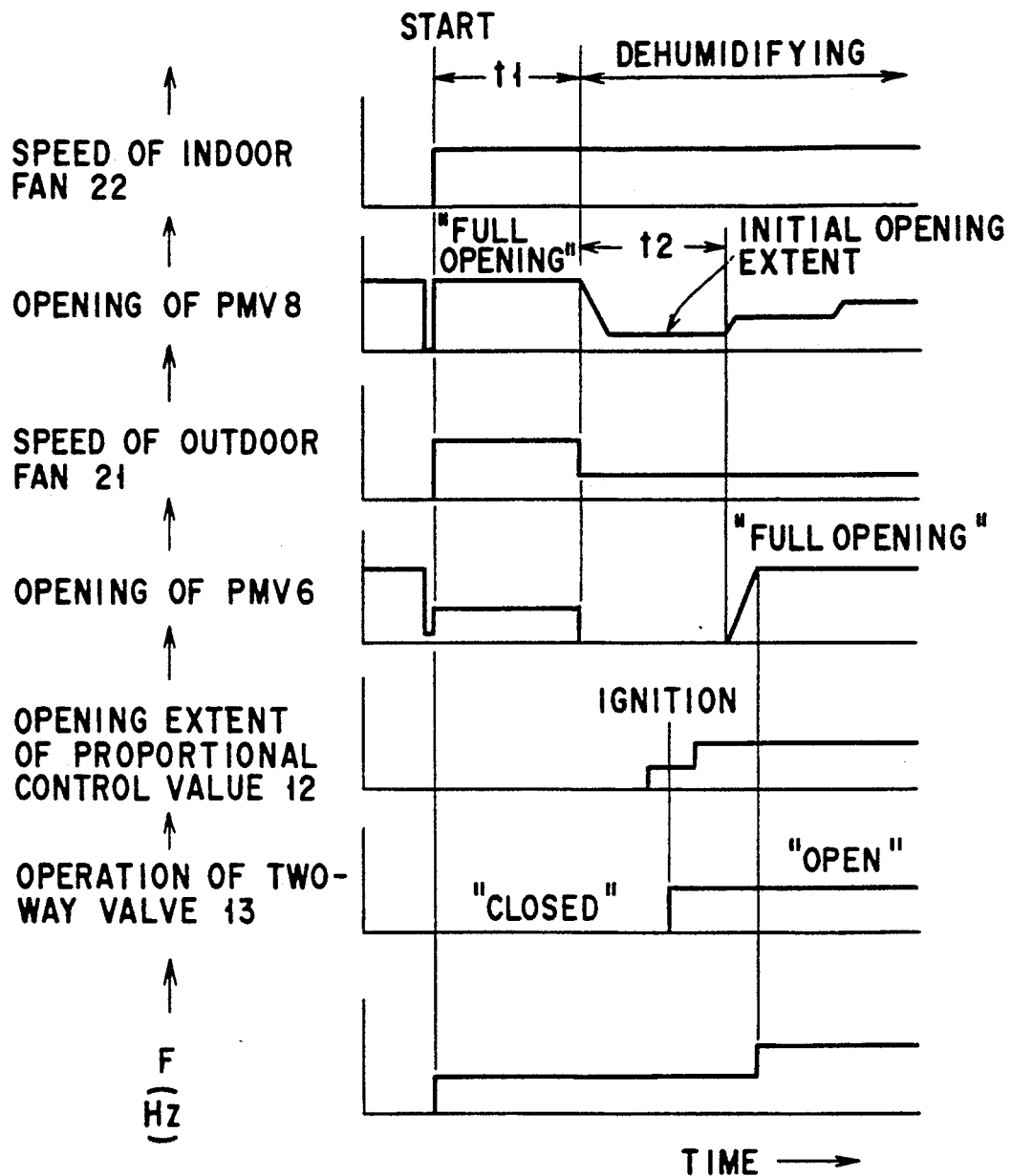
FIG. 9 is a time chart showing the function of the first embodiment at the start of dehumidifying operation.

This operation at the start operation time is shown in FIG. 9.

With a passage of the predetermined time $t_1$ (YES in step 141), the flag f is set to "0", clearing the time count t (step 142). Then PMV6 is fully opened, PMV8 reduced to its initial opening extent and the operation shifted to an actual dehumidifying operation (steps 132 to 137).

FIG. 9 shows the operation in a rather heating-side dehumidifying operation mode or in an isothermal dehumidifying operation mode. After lapse of the predetermined time $t_1$, a time $t_2$ is secured for the gas burner 11 in the refrigerant heater to be ignited.

In the operation starting time when the liquefaction of the refrigerant in the outdoor heat exchanger 3 is not stable, the cooling operation is performed to maintain PMV8 in a fully opened state and, even if a gas-mixed liquid refrigerant flows past PMV8, no resistance is involved there, thus producing no disturbing refrigerant noise.

In the aforementioned embodiment, the target opening extent of PMV8 at the time of dehumidifying operation stays constant in spite of a respective different one of the rather forced-cooling side dehumidifying, rather cooling-side dehumidifying, isothermal dehumidifying and rather heating-side dehumidifying operation modes. However, the target opening of PMV8 may be made different from mode to mode.

In cases where the target opening level of PMV8 is different from mode to mode, a change in capacity of the compressor 1, that is, a change in output frequency of the inverter 61, upon mode switching is made after a change is made in opening extent of PMV8.

Figure 10:
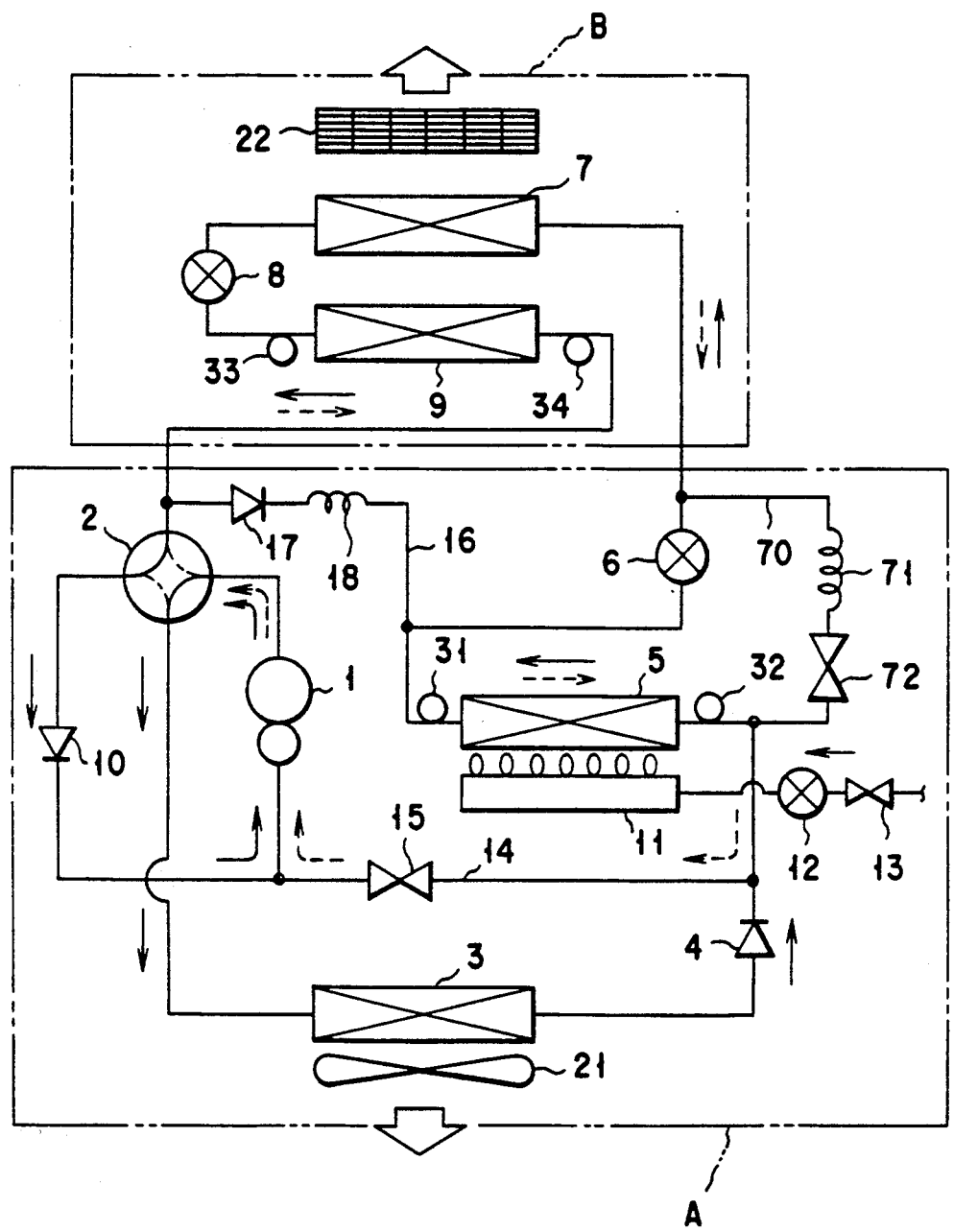
FIG. 10 is a block diagram showing the arrangement of a refrigerating cycle of a second embodiment of the present invention.

At a shift from the isothermal dehumidifying operation at, for example, the zone "6" to the rather cooling-side dehumidifying operation at the zone "9" in FIG. 10, the opening extent of PMV8 changes from the target opening level for the isothermal dehumidifying operation to the target opening level for the rather cooling-side dehumidifying operation and the capacity of the compressor 1 changes from the medium to the small level. After the opening extent of PMV8 has been varied, the compressor 1 has its capacity varied.

It is thus possible to avoid any abrupt refrigerant state change to the lowest possible extent by delaying a change in capacity of the compressor 1 in comparison with a change in opening extent of PMV8. It is thus possible to reduce noise, such as disturbing noise.

In the rather heating-side dehumidifying operation and isothermal dehumidifying operation with the refrigerant heater 5 ON, less refrigerant flows from the outdoor unit A to the indoor unit B, thus showing the tendency of the dehumidifying capacity to be deficient. It is, therefore, necessary that the opening extent of PMV8 be made at as low a level as possible (be made greater than the target opening level) and hence a flow of the refrigerant into the second indoor heat exchanger 9 be increased to the maximum possible extent.

With the opening extent of PMV8 reduced, a refrigerant pressure is lowered in the first indoor heat exchanger (reheater) 7 and the supercooling in the first indoor heat exchanger 7 becomes deficient. When this occurs, a gas-mixed liquid refrigerant flows into PMV8, thus there being a risk that disturbing noise will be produced.

A second embodiment of the present invention deals with this problem.

Figure 11B:
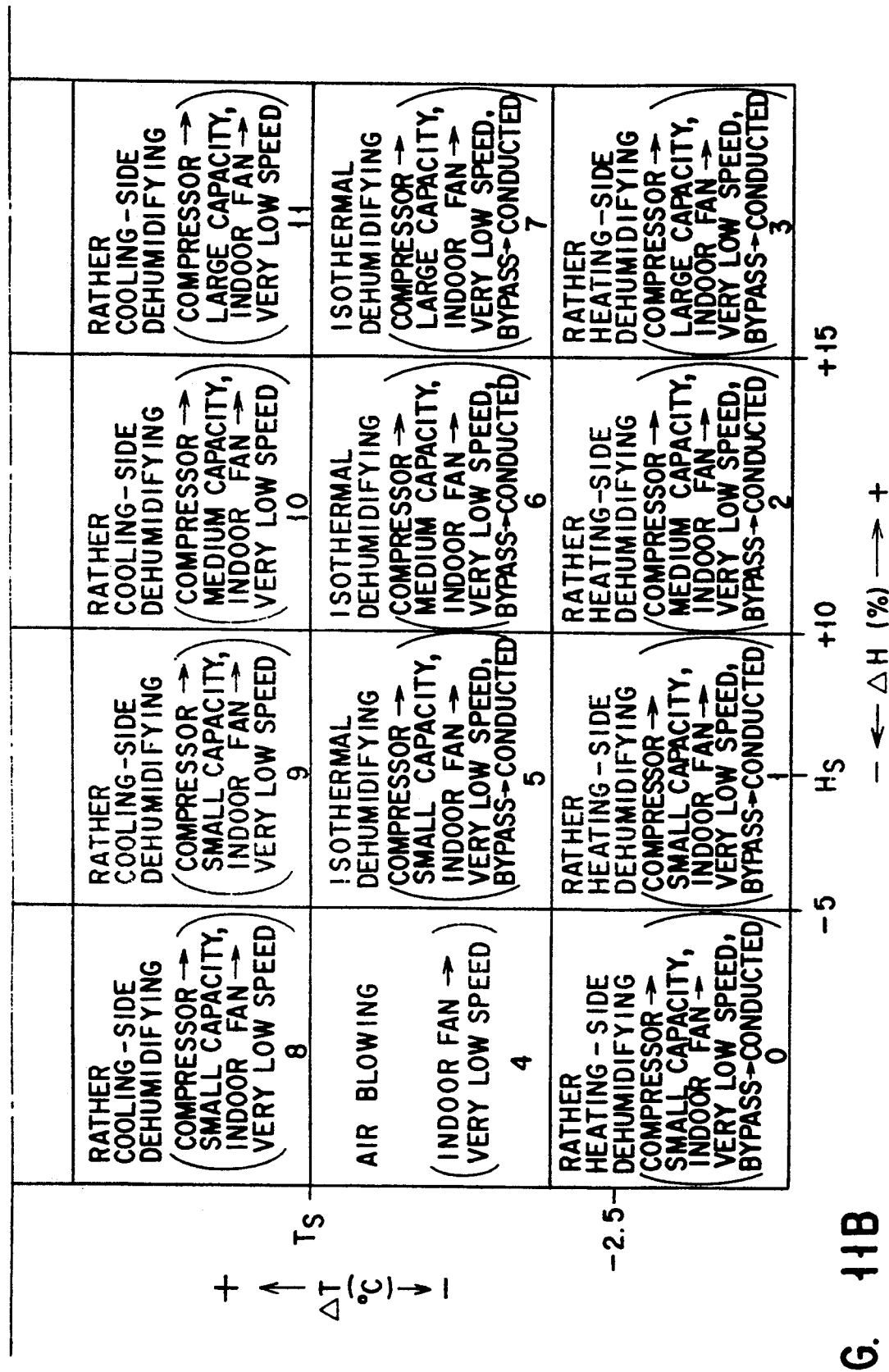

In the second embodiment, a shown in FIG. 10, a bypass pipe 70 is connected between a junction between a check valve 4 and a refrigerant heater 5 and a junction between PMV6 and a first indoor heat exchanger 7. A capillary tube 71 and two-way valve 72 are arranged on the bypass pipe 70. As shown in FIG. 11, in the rather heating-side dehumidifying operation and isothermal dehumidifying operation, the two-way valve 72 is opened and bypass pipe 70 is conducted.

With the bypass pipe 70 conducted, part of a refrigerant flowing through the refrigerant heater 5 is bypassed to the first indoor heat exchanger 7. Even if, therefore, the opening extent of PMV8 is reduced to a target opening level, an adequate amount of refrigerant flows through a second indoor heat exchanger 9, thus securing an adequate dehumidifying capacity.

Since, in this way, the opening extent of PMV8 is reduced to the target level, the pressure of the refrigerant goes high in the first indoor heat exchanger 7 and the supercooling of the refrigerant is adequately secured to allow only a liquid refrigerant to flow into PMV8. As a result, it is possible to prevent refrigerant noise from being produced.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An air conditioning apparatus having a dehumidifying operation, comprising:
   a compressor for sucking, compressing and discharging a refrigerant;
   an outdoor heat exchanger for making an exchange between refrigerant heat and outdoor air heat;
   an outdoor fan for sending outdoor air to the outdoor heat exchanger;
   a refrigerant heater for heating the refrigerant;
   pressure reducing means for reducing a refrigerant pressure;
   a first indoor heat exchanger for making an exchange between the refrigerant heat and indoor air heat;
   an electric expansion valve for allowing its extent of opening to be varied;
   a second indoor heat exchanger for making an exchange between the refrigerant heat and indoor air heat;
   an indoor fan for circulating the indoor air through second and first indoor heat exchangers;
   means for enabling the refrigerant which is discharged from the compressor to be returned back to the compressor through the outdoor heat exchanger, pressure reducing means, first indoor heat exchanger, electric expansion valve and second indoor heat exchanger and for fully opening the electric expansion valve and performing a cooling operation;
   means for enabling the refrigerant which is discharged from the compressor to be returned back to the compressor through the outdoor heat exchanger, refrigerant heater, first indoor heat exchanger, electric expansion valve and second indoor heat exchanger and for enabling the opening extent of the electric expansion valve to be reduced to a target opening level and a dehumidifying operation to be performed;
   means for controlling, at the time of dehumidifying operation, at least one of the operation of the outdoor fan and that of the refrigerant heater to adjust the temperature of air blown into a room; and
   means for, when during the dehumidifying operation the outdoor fan is rendered from an OFF to an ON state and from the ON to the OFF state, setting the opening extent of the electric expansion valve first to an initial opening level and then gradually varying the initial opening level toward the target opening level.

2. An apparatus according to claim 1, wherein the controlling means controls at least one of the operation of the outdoor fan and operation of the refrigerant heater according to which one of a plurality of zones the temperature and humidity of the air of the room belong to, the plurality zones representing predetermined temperature and humidity in the air of the room.

3. An apparatus according to claim 2, wherein the controlling means is provided for, according to which one of a plurality of zones the temperature and humidity of the air of the room belongs to, controlling said at least one of the operation of the outdoor fan and operation of the refrigerant heater and a capacity of the compressor and speed of the indoor fan.

4. An apparatus according to claim 2, wherein the controlling means is provided for, while sequentially shifting control in an adjacent zone direction at a time of shifting, performing control.

5. An apparatus according to claim 1, further comprising means for, at a time of stopping the dehumidifying operation, securing a predetermined time until the electric expansion valve reaches its full opening level.

6. An apparatus according to claim 1, further comprising means for, when the refrigerant heater is rendered in an ON state during dehumidifying operation, bypassing part of the refrigerant which flows from the outdoor heat exchanger to the refrigerant heater back to the first indoor-heat exchanger.

7. An apparatus according to claim 1, further comprising means for, when an operation mode at a time of starting operation is the dehumidifying operation mode, implementing a cooling operation for the first predetermined time period.

8. An apparatus according to claim 1, further comprising means for enabling a refrigerant which is discharged from the compressor to be returned back to the compressor through the second indoor heat exchanger, electric expansion valve, first indoor heat exchanger, pressure reducing means and refrigerant heater and for fully opening the electric expansion valve and implementing a heating operation.

9. An apparatus according to claim 8, further comprising means for detecting a superheating level of the refrigerant in the refrigerant heater and means for controlling an amount of heating by the refrigerant heater so that the superheating level reaches a predetermined level.

10. An air conditioning apparatus having a dehumidifying function, comprising:
    a compressor for sucking, compressing and discharging a refrigerant;
    an outdoor heat exchanger for making an exchange between refrigerant heat and outdoor air heat;
    an outdoor fan for supplying the outdoor air to the outdoor heat exchanger;
    a refrigerant heater for heating the refrigerant;
    pressure reducing means for reducing a refrigerant pressure;
    a first indoor heat exchanger for making an exchange between the refrigerant heat and indoor air heat;

an electric expansion valve for enabling its opening extent to be changed;

a second indoor heat exchanger for making an exchange between the refrigerant heat and the indoor air heat;

an indoor fan for circulating the indoor air through the second and first indoor heat exchangers;

means for enabling the refrigerant which is discharged from the compressor to be returned back to the compressor through the outdoor heat exchanger, pressure reducing means, first indoor heat exchanger, electric expansion valve and second indoor heat exchanger and for fully opening the electric expansion valve and implementing a cooling operation;

means for enabling a refrigerant which is discharged from the compressor to be returned back to the compressor through the outdoor heat exchanger, refrigerant heater, first indoor heat exchanger, electric expansion valve and second indoor heat exchanger and for reducing an opening extent of the electric expansion valve to a predetermined target opening level and implementing a dehumidifying operation;

means for controlling at least one of the operations of the outdoor fan and refrigerant heater at a time of dehumidifying operation to adjust temperature of air blown into a room; and means for implementing the cooling operation for the first predetermined time period when an operation mode at a time of starting operation is the dehumidifying operation.

11. An apparatus according to claim 10, wherein said controlling means controls at least one of the operation of the outdoor fan and operation of the refrigerant heater according to which one of a plurality of zones the temperature and humidity of the air of the room belong to, the plurality of zones representing predetermined temperature and humidity in the air of the room.

12. An apparatus according to claim 11, wherein said controlling means is provided for, according to which one of a plurality of zones the temperature and humidity of the air in the room belong to, controlling said at least one of the operation of the outdoor fan and operation of the refrigerant heater and a capacity of the compressor and speed of the indoor fan.

13. An apparatus according to claim 11, wherein said controlling means is provided for, while sequentially shifting control in an adjacent zone direction at a time of shifting, performing control.

14. An apparatus according to claim 10, further comprising means for, at a time of stopping the dehumidifying operation, securing a predetermined time period until the electric expansion valve reaches its full opening level.

15. An apparatus according to claim 10, further comprising means for, when the refrigerant heater is rendered in an ON state during dehumidifying operation, bypassing part of the refrigerant which flows from the outdoor heat exchanger to the refrigerant heater back to the first indoor heat exchanger.

16. An apparatus according to claim 10, further comprising means for returning the refrigerant which is discharged from the compressor to be returned back to the compressor through the second indoor heat exchanger, electric expansion valve, first indoor heat exchanger, pressure reducing means and refrigerant heater and for fully opening the electric expansion valve and implementing a heating operation.

17. An apparatus according to claim 16, further comprising means for detecting a superheating level of the refrigerant heater and means for controlling an amount of heating by the refrigerant heater so that the superheating level reaches a predetermined level.

* * * * *